(12) United States Patent
Hosaka et al.

(10) Patent No.: US 7,671,096 B2
(45) Date of Patent: *Mar. 2, 2010

(54) LIGHT STABILIZER EMULSION COMPOSITION

(75) Inventors: Masaki Hosaka, Tokyo (JP); Masatoshi Honma, Tokyo (JP); Yoshihide Kondo, Tokyo (JP)

(73) Assignee: Adeka Corporation, Tokyo (JP)

( * ) Notice: Subject to any disclaimer, the term of this patent is extended or adjusted under 35 U.S.C. 154(b) by 742 days.

This patent is subject to a terminal disclaimer.

(21) Appl. No.: 11/350,781

(22) Filed: Feb. 10, 2006

(65) Prior Publication Data

US 2006/0183824 A1    Aug. 17, 2006

(30) Foreign Application Priority Data

| Feb. 14, 2005 | (JP) | ............................... 2005-036365 |
| Jan. 17, 2006 | (JP) | ............................... 2006-008780 |

(51) Int. Cl.
  *C09K 3/00* (2006.01)
  *C08K 5/3435* (2006.01)

(52) U.S. Cl. ............................ 516/53; 524/99; 524/376

(58) Field of Classification Search ............... 516/53
  See application file for complete search history.

(56) References Cited

U.S. PATENT DOCUMENTS

| 5,772,920 | A | * | 6/1998 | Best et al. .................... 252/403 |
| 6,239,275 | B1 | * | 5/2001 | Gupta et al. ................. 544/213 |
| 6,635,702 | B1 | * | 10/2003 | Schmucker-Castner et al. ........................... 524/291 |
| 7,217,752 | B2 | * | 5/2007 | Schmucker-Castner et al. ........................... 524/291 |
| 2007/0240615 | A1 | * | 10/2007 | Tsuda et al. ........... 106/287.23 |

FOREIGN PATENT DOCUMENTS

| EP | 1 818 382 A1 | | 8/2007 |
| JP | 2003261759 A | * | 9/2003 |
| WO | WO94/07460 | * | 4/1994 |

OTHER PUBLICATIONS

Database WPI, Section Ch, Week 200418, Derwent Publications Ltd., AN 2004-183594, XP002387823 & JP 2003-261759 A (Fujikura Kasei KK), Sep. 19, 2003.
Database WPI, Section Ch, Week 199923, Derwent Publications Ltd., AN 1999-267266, XP002387824 & JP 11 080497 A (Toray Ind. Inc.), Mar. 26, 1999.

* cited by examiner

*Primary Examiner*—Ling-Siu Choi
*Assistant Examiner*—Chun-Cheng Wang
(74) *Attorney, Agent, or Firm*—Wenderoth, Lind & Ponack, L.L.P.

(57) ABSTRACT

The light stabilizer emulsion composition of the present invention includes: water; an emulsifier; and a light stabilizer and/or a UV absorber, in which components constituting the light stabilizer emulsion composition has an average particle size of 150 nm or less.

11 Claims, No Drawings

LIGHT STABILIZER EMULSION COMPOSITION

BACKGROUND OF THE INVENTION

1. Field of the Invention

The present invention relates to a light stabilizer emulsion composition for imparting weatherability to various aqueous coating agent compositions and to an aqueous coating agent composition containing the light stabilizer emulsion composition.

2. Description of the Related Art

The number of coating agent compositions not using organic solvents but water has been increasing in consideration of, for example, recent environmental problems. Examples of applications of such coating agent compositions include coating applications such as aqueous paint, aqueous ink, optical coating agents, agents for fibers, and agents for paper. A coating agent composition to be used for such applications is added with a light stabilizer to improve the weatherability of the formed coating film in some cases. The term "light stabilizer" as used herein refers to, for example, a hindered amine compound for capturing radicals generated by deterioration or a UV absorber for capturing ultraviolet.

However, such light stabilizers have a problem in that, when the light stabilizer is added to an aqueous composition, the blended light stabilizer is not dispersed well, so a formed coating film does not have sufficient weatherability because the light stabilizer is generally an oil-soluble organic compound. Light stabilizers have another problem in that light stabilizers added to coating agent compositions separate during the storage of the composition, thereby resulting in poor storage stability.

To cope with the foregoing, in, for example, an application where an aqueous emulsion is used, the addition of a light stabilizer in a step of polymerizing the aqueous emulsion has been known. For example, JP 11-080486 A discloses an acryl silicone emulsion composition obtained by the emulsion polymerization of a mixture containing: a monomer mixture composed of 30 to 96 wt % (mass %) of a (meth)acrylate monomer (1), 1 to 10 wt % (mass %) of one kind of specific polymerizable carboxylic acid (2) or a mixture of two or more kinds of such carboxylic acids, 1 to 10 wt % (mass %) of a polymerizable emulsifier (3), 1 to 20 wt % (mass %) of a benzophenone- or benzotriazole-based polymerizable light stabilizer (4), and 1 to 30 wt % (mass %) of an organoalkoxysilane compound having at least one glycidyl group in one molecule thereof (5) (the total amount of them is 100 wt % (mass %)); and 0.1 to 5 wt % (mass %) of a hindered amine-based light stabilizer (HALS) having a base constant (PKb) of 8 or more (6) (claim 1).

In addition, JP 2002-285045 A discloses an aqueous paint composition containing (A) a fluoroolefin-based copolymer emulsion and (B) a copolymer emulsion containing a UV absorber and/or a light stabilizer obtained by the emulsion polymerization of a mixture of: a monomer mixture composed of (a) 5 to 70 wt % (mass %) of a polymerizable unsaturated monomer having a cycloalkyl group and (b) 30 to 95 wt % (mass %) of any other polymerizable unsaturated monomer; and (c) the UV absorber and/or the light stabilizer (claim 1). In addition, the paragraph [0016] of JP2002-285045A discloses a UV absorber such as a salicylic acid derivative or a benzophenone- or benzotriazole-based UV absorber and a light stabilizer such as a hindered amine derivative.

A method involving: emulsifying or dispersing a light stabilizer into water in advance; and adding the resultant to an aqueous emulsion has been also known. For example, JP 2003-261759 A discloses: a light stabilizer aqueous emulsion containing a light stabilizer, an emulsifier, and water, in which the content of the light stabilizer is 20 to 85 mass % (claim 1); and the light stabilizer aqueous emulsion in which the light stabilizer is a triazine-based UV absorber (claim 3). The light stabilizer aqueous emulsion can be added to an aqueous emulsion or an aqueous coating agent composition later. Therefore, the light stabilizer aqueous emulsion has an advantage in that it has an extremely simple structure and easily exhibits the function of so-called weatherability.

According to JP 11-080486 A and JP 2002-285045 A described above, a light stabilizer can be uniformly dispersed into an aqueous emulsion. However, the light stabilizer is captured by emulsion particles, so there arises a problem in that the formed coating film does not have sufficient weatherability.

In addition, the light stabilizer aqueous emulsion of JP 2003-261759 A prepared by emulsifying or dispersing a light stabilizer into water can be added to an aqueous emulsion or an aqueous coating agent composition later. Therefore, the light stabilizer aqueous emulsion has an advantage in that it has an extremely simple structure and easily exhibits the function of so-called weatherability. However, such prior art has a problem in that separation or precipitation is apt to occur, so storage stability is poor. Furthermore, the formation of a coating film by means of an aqueous coating agent composition to which such a compound of the prior art has been added involves the emergence of reductions in various physical properties of the coating film such as the deterioration of gloss and insufficient color development.

SUMMARY OF THE INVENTION

Therefore, an object of the present invention is to provide: a light stabilizer emulsion composition which has good long-term storage stability and does not deteriorate various physical properties of a coating film to be formed even when the composition is added to an aqueous coating agent composition; and an aqueous coating agent composition containing the light stabilizer emulsion composition.

To this end, the inventors of the present invention have found that a light stabilizer emulsion composition which has good long-term storage stability and does not reduce various physical properties of a formed coating film even when the composition is added to an aqueous coating agent composition can be provided by emulsifying in such a manner that the average particle size of components constituting the light stabilizer emulsion composition is reduced to a specific size, thus, completing the present invention.

That is, according to one aspect of the present invention, there is provided a light stabilizer emulsion composition containing: water; an emulsifier; and a light stabilizer and/or a UV absorber (hereinafter, collectively referred to as a "light stabilizer or the like" in the specification), in which components constituting the light stabilizer emulsion composition has an average particle size of 150 nm or less.

In a further aspect of the light stabilizer emulsion composition, a nonionic surfactant (B) to be described later is used together as an emulsifier.

According to another aspect of the present invention, there is provided an aqueous coating agent composition containing the light stabilizer emulsion composition.

According to another aspect of the present invention, there is provided a coated product having a coating film formed of the aqueous coating agent composition.

DESCRIPTION OF THE PREFERRED EMBODIMENTS

The applicant of the present invention has already filed on application for a light stabilizer emulsion composition containing: an emulsifier having a polyether chain obtained by reacting two or more kinds of alkylene oxides with each other as a hydrophilic group and a hydrocarbon group having 1 to 30 carbon atoms as a hydrophobic group; alight stabilizer or the like; and water (Japanese Patent Application No. 2004-228397). In the application, the amount of emulsifier to be used is within the range of 1 to 40 mass (weight) % with respect to the light stabilizer or the like. However, it has been found that the amount of emulsifier to be used in this range does not allow the average particle size of components constituting the light stabilizer emulsion composition to be reduced to 150 nm or less.

The term "emulsion composition" as used herein refers to a state where one substance of two kinds of substances that do not mix with each other such as water and oil are dispersed into the other substance as a liquid. The emulsion compositions are roughly classified into two kinds: an O/W type and a W/O type. The O/W type is obtained by dispersing a non-water-soluble substance into water as a continuous layer, and an example thereof includes milk. In addition, the W/O type is obtained by dispersing water or a water-soluble substance into oil as a continuous layer, and an example thereof includes margarine. The light stabilizer emulsion composition of the present invention is an O/W type emulsion composition, and succeeds in obtaining an effect of the present invention as a result of the dispersion of components constituting the light stabilizer emulsion composition and having an average particle size of 150 nm or less into water. The "average particle size" can be measured by means of a particle size distribution meter based on, for example, dynamic light scattering. The term "components constituting the light stabilizer emulsion composition" as used herein refers to a component composed only of one or more kinds of light stabilizers and the like, or a mixed component of any other component to be described later and the light stabilizer or the like. The case where any other component is mixed with a light stabilizer occurs when the other component is insoluble in water. The "average particle size of a light stabilizer", "average particle size of the light stabilizer emulsion composition", or "emulsion particle" to be described later is a description for components constituting the light stabilizer emulsion composition.

In order that components constituting the light stabilizer emulsion composition may be stably dispersed into water so as to have an average particle size of 150 nm or less, emulsification should be performed in such a manner that the total amount of the emulsifier to be used is within the range of 40 parts by mass (weight) (exclusive) to 100 parts by mass (weight) (inclusive) with respect to 100 parts by mass (weight) of the light stabilizer.

A nonionic surfactant (A) used as part or whole of the emulsifier of the light stabilizer emulsion composition of the present invention may be any compound having a polyether chain containing an oxyethylene group and an oxyalkylene group having 3 or more carbon atoms and having a hydrocarbon group.

Examples of the nonionic surfactant (A) as described above include: ethers such as an alkyl (or alkenyl) ether of a polyoxyethylene/polyoxypropylene block or random copolymer, an alkyl (or alkenyl) ether of a polyoxyethylene/polyoxybutylene block or random copolymer, an alkyl (or alkenyl) phenyl ether of a polyoxyethylene/polyoxypropylene block or random copolymer, an alkyl (or alkenyl) amine ether of a polyoxyethylene/polyoxypropylene block or random copolymer, a polyhydric alcohol ether of a polyoxyethylene/polyoxypropylene block or random copolymer, a polyamine ether of a polyoxyethylene/polyoxypropylene block or random copolymer, and a polysaccharide, monosaccharide, or oligosaccharide ether of a polyoxyethylene/polyoxypropylene block or random copolymer; and esters such as an aliphatic ester of a polyoxyethylene/polyoxypropylene block or random copolymer and an ester obtained by an esterification reaction between any one of the above ethers and an aliphatic acid.

The nonionic surfactant (A) particularly preferable as such a compound as represented by the following general formula (1).

$$R\!-\!O\!-\!(AO)_n\!-\!H \qquad (1)$$

(In the formula, R represents a hydrocarbon group having 8 to 30 carbon atoms, A represents two or more kinds of alkylene groups each having 2 to 4 carbon atoms, ethylene groups account for 50 mol % or more of an entirety of A, and n represents a number of 8 to 80.)

In the general formula (1), R represents a hydrocarbon group having 8 to 30 carbon atoms. Examples of such hydrocarbon groups include an alkyl group, an alkenyl group, and an aryl group.

Examples of the alkyl group include octyl, 2-ethylhexyl, secondary octyl, nonyl, secondary nonyl, decyl, secondary decyl, undecyl, secondary undecyl, dodecyl, secondary dodecyl, tridecyl, isotridecyl, secondary tridecyl, tetradecyl, secondary tetradecyl, hexadecyl, secondary hexadecyl, stearyl, eicosyl, docosyl, tetracosyl, triacontyl, 2-butyloctyl, 2-butyldecyl, 2-hexyloctyl, 2-hexyldecyl, 2-octyldecyl, 2-hexyldodecyl, 2-octyldodecyl, 2-decyltetradecyl, 2-dodecylhexadecyl, 2-hexadecyloctadecyl, 2-tetradecyloctadecyl, monomethyl branched-isostearyl, heneicosyl, tricosyl, pentacosyl, hexacosyl, heptacosyl, octacosyl, and nonacosyl groups.

Example of the alkenyl group include octenyl, nonenyl, decenyl, undecenyl, dodecenyl, tetradecenyl, and oleyl groups.

Examples of the aryl group include xylyl, cumenyl, mesityl, phenethyl, styryl, cinnamyl, benzhydryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl, styrenated phenyl, p-cumylphenyl, phenylphenyl, benzylphenyl, α-naphthyl, and β-naphthyl groups.

Of those hydrocarbon groups, R preferably represents an alkyl group or an alkenyl group, and a group represented by R more preferably has 8 to 24 carbon atoms, or still more preferably has 8 to 20 carbon atoms. When the number of carbon atoms is less than 8, the performance of the surfactant as an emulsifier is poor, so storage stability deteriorates in some cases. In addition, carbon atoms in excess of 30 is not preferable because, when the light stabilizer emulsion composition of the present invention is added to an aqueous coating agent composition, compatibility is so poor that the composition of the present invention may precipitate.

When a water-soluble polymer such as polyvinyl alcohol or carboxymethylcellulose is mixed with the surfactant, a group represented by R preferably has 8 to 16 carbon atoms in consideration of compatibility. The surfactant is mixed with such water-soluble polymer, for example, before the mixture is applied to ink-jet paper or the like.

Next, in the general formula (1), A represents two or more kinds of alkylene groups each having 2 to 4 carbon atoms.

Examples of a group represented by A include ethylene, propylene, methylethylene, butylene, 1-methylpropylene, 2-methylpropylene, and ethylethylene groups. Those groups can be derived from, for example, ethylene oxide, propylene oxide, butylene oxide, tetrahydrofuran, and (1,4-butyleneoxide).

A combination of A's may be any combination of two or more kinds of alkylene groups, and a combination of an ethylene group derived from ethylene oxide and an alkylene group derived from any other alkylene oxide is preferable. Propylene oxide or butylene oxide is a preferable alkylene oxide to be combined with an ethylene group, and propylene oxide is the most preferable alkylene oxide to be combined therewith. The polymerization form of an alkylene oxide to be added is not limited, and, for example, a random copolymer, block copolymer, or random/block copolymer of ethylene oxide and one or two or more kinds of any other alkylene oxides is available. Of those, a random copolymer is preferable in terms of the stability of the light stabilizer emulsion composition and the size of an emulsion particle.

Ethylene groups account for preferably 50 mol % or more, more preferably 50 to 99 mol %, still more preferably 60 to 95 mol %, or most preferably 68 to 92 mol % of an entirety of A's in terms of emulsifiability. A ratio of ethylene groups of less than 50 mol % is not preferable because the performance of the surfactant as an emulsifier is not sufficiently exerted and components constituting the light stabilizer emulsion composition cannot be uniformly emulsified. A ratio of ethylene groups of 100 mol % is not preferable either because melting point increases, so storage stability deteriorates or the size of emulsion particles increase owing to, for example, precipitation in some cases, and, furthermore, when the light stabilizer emulsion composition is added to an aqueous coating agent composition and the whole is formed into a coating film, the physical properties of the formed coating film such as gloss in the case of paint or the like deteriorate.

Furthermore in the general formula (1), n represents a number of 8 to 80, preferably 8 to 70, more preferably 8 to 60, or still more preferably 8 to 40, and n of less than 8 is not preferable because the performance of the composition of the present invention as an emulsion composition is not sufficiently exerted in some cases. An n in excess of 80 is not preferable either because emulsion stability may deteriorate. When a water-soluble polymer such as polyvinyl alcohol or carboxymethylcellulose is mixed with the surfactant, n represents a number of preferably 8 to 30, or more preferably 8 to 20 in terms of compatibility. The surfactant is mixed with such water-soluble polymer, for example, before the mixture is applied to ink-jet paper or the like.

The light stabilizer emulsion composition of the present invention may use a nonionic surfactant (B) as an emulsifier in combination with the above-described nonionic surfactant (A). The nonionic surfactant (B) has only to be a nonionic surfactant other than the nonionic surfactant (A), and examples thereof include: a polyoxyethylene alkyl ether; a polyoxyethylene alkenyl ether; a polyoxyethylene aryl ether; a propylene oxide adduct of polyethylene glycol; an ethylene oxide adduct of polypropylene glycol; a glycerin aliphatic acid ester; an ethylene oxide adduct of a glycerin aliphatic acid ester; a sorbitan aliphatic acid ester; a polyoxyethylene sorbitan aliphatic acid ester; an alkylpolyglucoside; an aliphatic acid monoethanol amide or an ethylene oxide adduct thereof; an aliphatic acid-N-methylmonoethanol amide or an ethylene oxide adduct thereof; an aliphatic acid diethanol amide or an ethylene oxide adduct thereof; a sucrose aliphatic acid ester; an alkyl(poly)glycerin ether; a polyglycerin aliphatic acid ester; a polyethylene glycol aliphatic acid ester; an aliphatic acid methyl ester ethoxylate; and an N-long chain alkyldimethylamine oxide.

Of those, the nonionic surfactant (B) is preferably a sorbitan ester-based compound or a compound represented by the following general formula (2) for achieving an average particle size of components constituting the light stabilizer emulsion composition of 150 nm or less.

$$\text{H-(EO)}_p\text{---(PO)}_q\text{-(EO)}_r\text{---OH} \qquad (2)$$

(In the formula, EO represents an oxyethylene group, PO represents an oxypropylene group, q represents a number of 20 to 80, p and r each independently represent a number of 2 to 32, and oxyethylene groups account for 30 wt % or less of the total compound.)

Examples of a sorbitan ester-based compound that can be used as the nonionic surfactant (B) include: sorbitan aliphatic acid esters such as a sorbitan monolaurate, a sorbitan dilaurate, a sorbitan trilaurate, a sorbitan monomyristate, a sorbitan dimyristate, a sorbitan trimyristate, a sorbitan monopalmitate, a sorbitan dipalmitate, a sorbitan tripalmitate, a sorbitan monostearate, a sorbitan distearate, a sorbitan tristearate, a sorbitan monooleate, a sorbitan dioleate, and a sorbitan trioleate; and polyoxyethylene sorbitan aliphatic acid esters such as a polyoxyethylene sorbitan monolaurate, a polyoxyethylene sorbitan dilaurate, a polyoxyethylene sorbitan trilaurate, a polyoxyethylene sorbitan monomyristate, a polyoxyethylene sorbitan dimyristate, a polyoxyethylene sorbitan trimyristate, a polyoxyethylene sorbitan monopalmitate, a polyoxyethylene sorbitan dipalmitate, a polyoxyethylene sorbitan tripalmitate, a polyoxyethylene sorbitan monostearate, a polyoxyethylene sorbitan distearate, a polyoxyethylene sorbitan tristearate, a polyoxyethylene sorbitan monooleate, a polyoxyethylene sorbitan dioleate, and a polyoxyethylene sorbitan trioleate. Of those sorbitan ester-based compounds, polyoxyethylene sorbitan aliphatic acid esters are preferable for achieving an average particle size of components constituting the light stabilizer emulsion composition of 150 nm or less.

The compound represented by the general formula (2) can be obtained by adding an oxyethylene group to, for example, polypropylene glycol represented by $\text{HO---(C}_3\text{H}_6\text{O)}_q\text{---H}$ where q represents an average addition number of moles of an oxypropylene group, and is a number of 20 to 80, or preferably 25 to 70. When q is less than 20, the performance of the compound as an emulsifier is not sufficiently exerted in some cases. In addition, q in excess of 80 is not preferable because polypropylene glycol to be produced may involve the generation of a low-molecular-weight by-product such as propylene glycol or dipropylene glycol in a large amount, so the performance of the compound as an emulsifier is not sufficiently exerted in some cases.

p and r each represent an average addition number of moles of ethylene oxide added to two hydroxyl groups of polypropylene glycol represented by $\text{HO---(C}_3\text{H}_6\text{O)}_q\text{---H}$, and are each a number of 2 to 32. When the average addition number of moles of ethylene oxide is less than 2, the performance of the compound as an emulsifier is not sufficiently exerted in some cases. When the number exceeds 32, storage stability may be adversely affected. The average addition number of moles of ethylene oxide is preferably such that the molecular weight of polyethylene glycol accounts for 30 mass % or less (more preferably 5 to 25 mass %, still more preferably 5 to 20 mass %, or most preferably 5 to 15 mass %) of the total molecular weight of a block copolymer. A ratio of ethylene oxide in excess of 30 mass % is not preferable because storage stability may be adversely affected.

The amount of the emulsifier in the light stabilizer emulsion composition of the present invention is within a range in which the average particle size of the components constituting the light stabilizer emulsion composition can be 150 nm or less. The amount of the emulsifier is within the range of 40 parts by mass (exclusive) to 100 parts by mass (inclusive) with respect to 100 parts by mass of the light stabilizer or the like. In addition, the content of the nonionic surfactant (A) in the emulsifier is within the range of 50 to 100 mass %. More preferably, the amount of the emulsifier is within the range of 42 to 100 parts by mass with respect to 100 parts by mass of the light stabilizer or the like, and the content of the nonionic surfactant (A) in the emulsifier is within the range of 50 to 100 mass %. Still more preferably, the amount of the emulsifier is within the range of 45 to 80 parts by mass with respect to 100 parts by mass of the light stabilizer or the like, and the content of the nonionic surfactant (A) in the emulsifier is within the range of 50 to 100 mass %.

The light stabilizer emulsion composition of the present invention may require a larger amount of an emulsifier than that in the case of ordinary emulsification because the average particle size of the components constituting the light stabilizer emulsion composition must be 150 nm or less. This is because the surface area of each of the components constituting the light stabilizer emulsion composition increases with decreasing average particle size of the components, and the required amount of an emulsifier also increases in proportion to the surface area. It should be noted that an amount of an emulsifier of 40 mass % or less does not allow the average particle size of the components constituting the light stabilizer emulsion composition to be 150 nm or less.

The light stabilizer emulsion composition of the present invention is a composition containing the above emulsifier, water, and a light stabilizer or the like. A hindered amine-based light stabilizer or a UV absorber such as a benzophenone-, benzotriazole-, triazine-, benzoate-, oxanilide-, or cyanoacrylate-based UV absorber can be used as the light stabilizer or the like.

Examples of the hindered amine-based light stabilizer include: 2,2,6,6-tetramethyl-4-piperidyl stearate; 1,2,2,6,6-pentamethyl-4-piperidyl benzoate; N-(2,2,6,6-tetramethyl-4-piperidyl)dodecylsuccinic acid imide; 1-[(3,5-ditertiary-butyl-4-hydroxyphenyl)propionyloxyethyl]-2,2,6,6-tetramethyl-4-piperidyl-(3,5-ditertiary-butyl-4-hydroxyphenyl)propionate; bis(2,2,6,6-tetramethyl-4-piperidyl)sebacate; bis(1,2,2,6,6-pentamethyl-4-piperidyl)sebacate; bis(1,2,2,6,6-pentamethyl-4-piperidyl)-2-butyl-2-(3,5-ditertiary-butyl-4-hydroxybenzyl)malonate; N,N'-bis(2,2,6,6-tetramethyl-4-piperidyl)hexamethylenediamine; tetra(2,2,6,6-tetramethyl-4-piperidyl)butane tetracarboxylate; tetra(1,2,2,6,6-pentamethyl-4-piperidyl)butane tetracarboxylate; bis(2,2,6,6-tetramethyl-4-piperidyl)di(tridecyl)butane tetracarboxylate; bis(1,2,2,6,6-pentamethyl-4-piperidyl)di(tridecyl)butane tetracarboxylate; 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5,5]undecane; 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5,5]undecane; 1,5,8,12-tetrakis[4,6-bis{N-(2,2,6,6-tetramethyl-4-piperidyl)butylamino}-1,3,5-triazin-2-yl]-1,5,8,12-tetraazadodecane; 1,6,11-tris[{4,6-bis(N-butyl-N-(1,2,2,6,6-pentamethylpiperidin-4-yl)amino)-1,3,5-triazin-2-yl}amino]undecane; 1-(2-hydroxyethyl)-2,2,6,6-tetramethyl-4-piperidinol/dimethyl succinate condensate; 2-tertiary-octylamino-4,6-dichloro-s-triazine/N,N'-bis(2,2,6,6-tetramethyl-4-piperidyl)hexamethylenediamine condensate; N,N'-bis(2,2,6,6-tetramethyl-4-piperidyl)hexamethylenediamine/dibromoethane condensate; and 1,2,3,4-butane tetracarboxylic acid/1,2,2,6,6-pentamethyl-4-piperidyl/β,β,β,β-tetramethyl-3,9-(2,4,8,10-tetraoxaspiroundecane)diethanol condensate.

In addition, examples of the UV absorber include: 2-hydroxybenzophenones such as 2,4-dihydroxybenzophenone, 2-hydroxy-4-methoxybenzophenone, 2-hydroxy-4-octoxybenzophenone, 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tertiary-octylphenyl)benzotriazole, 2-(2-hydroxy-3,5-ditertiary-butylphenyl)-5-chlorobenzotriazole, 2-(2-hydroxy-3-tertiary-butyl-5-methylphenyl)-5-chlorobenzotriazole, 2-(2-hydroxy-3,5-dicumylphenyl)benzotriazole, 2,2'-methylenebis(4-tertiary-octyl-6-benzotriazolylphenol), a polyethylene glycol ester of 2-(2-hydroxy-3-tertiary-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tertiary-butylphenyl]benzotriazole, 2-[2-hydroxy-3-(2-methacryloyloxyethyl)-5-tertiary-octylphenyl]benzotriazole, 2-[2-hydroxy-3-(2-methacryloyloxyethyl)-5-tertiary-butylphenyl]-5-chlorobenzotriazole, 2-[2-hydroxy-5-(2-methacryloyloxyethyl)phenyl]benzotriazole, 2-[2-hydroxy-3-tertiary-butyl-5-(2-methacryloyloxyethyl)phenyl]benzotriazole, 2-[2-hydroxy-3-tertiary-amyl-5-(2-methacryloyloxyethyl)phenyl]benzotriazole, 2-[2-hydroxy-3-tertiary-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-$C_{12}$ to $C_{13}$ mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-[2-hydroxy-4-(2-acetyloxyethoxy)phenyl]-4,6-bisphenyl-1,3,5-triazine, 2-(2,4-dihydroxy-3-allylphenyl)-4,6-bis(2,4-dimethylphenyl)-1,3,5-triazine, 2,4,6-tris(2-hydroxy-3-methyl-4-hexyloxyphenyl)-1,3,5-triazine, and 2-(2-hydroxyphenyl)-4,6-diaryl-1,3,5-triazine; benzoates such as phenyl salicylate, resorcinol monobenzoate, 2,4-ditertiary-butylphenyl-3,5-ditertiary-butyl-4-hydroxybenzoate, hexadecyl-3,5-ditertiary-butyl-4-hydroxybenzoate, and stearyl(3,5-ditertiary-butyl)-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenyl acrylate and methyl-2-cyano-3-methyl-3-(p-methoxyphenyl)acrylate.

Only one kind of these light stabilizers and the like may be used, or two or more kinds of them may be used in combination as required. A hindered amine-based light stabilizer is preferably used in terms of emulsion stability.

The light stabilizer emulsion composition of the present invention is obtained by emulsifying and dispersing components constituting the light stabilizer emulsion composition and having an average particle size of 150 nm or less by means of an emulsifier and water, and contains preferably 1 to 50 mass %, more preferably 5 to 45 mass %, or still more preferably 10 to 40 mass % of a light stabilizer or the like. An amount of the light stabilizer or the like of less than 1 mass % is not preferable because a large amount of the composition of the present invention must be added to an aqueous coating agent composition for imparting sufficient weatherability to the aqueous coating agent composition, with the result that the aqueous coating agent composition is diluted with a large amount of water to adversely affect the formation of a coating film. An amount of the light stabilizer or the like in excess of 50 mass % is not preferable either because the stability of the light stabilizer emulsion composition may reduce.

A method of producing the light stabilizer emulsion composition of the present invention has only to be a method involving emulsifying water, a light stabilizer or the like, an emulsifier, and any other component by means of a known emulsification method. Examples of the emulsification method include a phase inversion emulsification method and a mechanically forced emulsification method, and any one of them may be used. Examples of devices that can be used for performing these emulsification methods include a high speed propeller-type stirrer, a Homomixer [manufactured by PRIMIX Corporation], a high-pressure homogenizer, a particle sizer, an ultrasonic emulsifier, and a bead mill. Of these devices, a high-pressure emulsifier for performing emulsification under pressure such as a high-pressure homogenizer or a particle sizer, or a bead mill are preferably used for emulsification because an emulsion composition having a small average particle size can be obtained.

A high-pressure emulsifier such as a high-pressure homogenizer is intended for continuously treating a solution to be emulsified. Preferably, an emulsion that has been emulsified by means of a Homomixer or the like once is treated by means of a high-pressure emulsifier, whereby the emulsion can contain particles with additionally reduced sizes. Examples of a method for that purpose include: a method involving feeding a solution emulsified by means of a Homomixer or the like into a high-pressure emulsifier from the lower portion of a tank storing the solution and transferring the treated solution to another tank; and a method involving feeding a solution emulsified by means of a Homomixer or the like into a high-pressure emulsifier from the lower portion of a tank storing the solution and returning the treated solution to the original tank. Of these, a method involving returning a solution treated by means of a high-pressure emulsifier to an original tank is preferable because all treatments can be performed in one tank and the solution can be treated by means of the high-pressure emulsifier any number of times.

In addition, a bead mill is intended for preparing an emulsion composition by: mixing a mixture of water, an emulsifier, and a light stabilizer and/or a UV absorber in a container containing beads of glass, metal, ceramic, resin, or the like; and finely pulverizing particles of the light stabilizer and/or the UV absorber. In order for the average particle size of the light stabilizer or the like to be 150 nm or less, beads each having a diameter of 0.3 mm or less are preferably used, and beads each having a diameter of 0.1 mm or less are more preferably used. Beads each having a diameter in excess of 0.3 mm may not provide the light stabilizer or the like with an average particle size of 150 nm or less. Pre-emulsion by means of a Homomixer or the like before treatment by means of a bead mill is preferable because a light stabilizer emulsion composition having a small particle size can be easily obtained.

When the average particle size of the components constituting the light stabilizer emulsion composition is 150 nm or less, the performance of the composition as a light stabilizer or the like, the stability of the emulsion composition, and the like increase. In addition, when the composition is applied to ink-jet paper or the like, the irregular reflection and interference of light can be prevented. When the composition is used for ink-jet ink, nozzle with extremely small diameters can be prevented from being clogged with the ink. Such performance is increased as the average particle size of the light stabilizer or the like is reduced. Therefore, in the present invention, the average particle size of the components constituting the light stabilizer emulsion composition, which is preferably set to 150 nm or less, is more preferably 140 nm or less, or still more preferably 130 nm or less. An average particle size of 150 nm or less can be obtained through emulsification by means of the emulsifier with its loading appropriately adjusted. For obtaining an emulsion composition having an additionally small size, treatment is preferably performed several times or for a long time period by means of the high-pressure emulsifier or the bead mill described above.

To be specific, for example, when a solution to be treated (C kg) is treated by means of a high-pressure emulsifier or a bead mill having a throughput capacity (D kg/hr), treatment time is preferably longer than a time C/D, more preferably longer than 1.5× the time C/D, or still more preferably longer than 2× the time C/D. A treatment time shorter than the time C/D may not reduce average particle size.

The light stabilizer emulsion composition of the present invention can be added to any aqueous composition, provided that the main object of the composition is to improve the weatherability of a coating film, so the composition is preferably added to an aqueous coating agent composition requiring weatherability. Examples of such an aqueous coating agent composition requiring weatherability include: a resin emulsion composition such as aqueous paint; an aqueous ink composition using a coloring agent such as a dye or a pigment; an aqueous coating agent composition for paper such as ink-jet paper, heat sensitive paper, or wall paper; a coating agent composition for floors such as wood, tile, or cushion floors; an aqueous coating agent composition for a fiber; an aqueous coating agent composition for optics such as a protective layer of an optical recording carrier; and an aqueous coating agent composition intended for protecting and decorating metal, glass, or the like.

The light stabilizer emulsion composition of the present invention is preferably added in such a manner that the amount of the light stabilizer or the like in the light stabilizer emulsion composition is 0.001 to 5 parts by mass (weight) [more preferably 0.01 to 3 parts by mass (weight), or most preferably 0.05 to 3 parts by mass (weight)] with respect to 100 parts by mass (weight) of such aqueous coating agent composition. When the amount is less than 0.001 parts by mass (weight), the addition may not provide sufficient weatherability. Meanwhile, an amount in excess of 5 parts by mass (weight) is not preferable because the weatherability or the like of a coating film may deteriorate, or an effect commensurate with the amount of the composition added may not be obtained.

The light stabilizer emulsion composition of the present invention can be added with another surfactant, an antioxidant, a solvent, or an additive such as an antiseptic as required to the extent that the effect of the present invention is not impaired. When such substance is insoluble in water, the substance can be emulsified together with the light stabilizer or the like to be used in the present invention.

Examples of the surfactant include an anionic surfactant, a cationic surfactant, and an amphoteric surfactant. Examples of the anionic surfactant include: the sulfates, sulfonates, and phosphates of the above-described nonionic surfactants and alcohols; and aliphatic acid soap.

Examples of the cationic surfactant include a tetraalkyl ammonium salt, an alkyl pyridinium salt, and an iminium salt.

Examples of the amphoteric surfactant include an amino acid-type amphoteric surfactant, a betaine-type amphoteric surfactant, a sulfate-type amphoteric surfactant, a sulfonate-type amphoteric surfactant, and a phosphate-type amphoteric surfactant.

Examples of the antioxidant include a phosphorus-based antioxidant, a phenol-based antioxidant, a sulfur-based antioxidant, and an amine-based antioxidant.

Examples of the phosphorus-based antioxidant include: triphenyl phosphite; tris(2,4-ditertiary-butylphenyl)phosphite; tris(2,5-ditertiary-butylphenyl)phosphite; tris(nonylphenyl)phosphite; tris(dinonylphenyl)phosphite; tris (mono, di-mixed nonylphenyl)phosphite; diphenyl acid phosphite; 2,2'-methylenebis(4,6-ditertiary-butylphenyl)octyl phosphite; diphenyldecyl phosphite; diphenyloctyl phosphite; di(nonylphenyl)pentaerythritol diphosphite; phenyldiisodecyl phosphite; tributyl phosphite; tris(2-ethylhexyl) phosphite; tridecyl phosphite; trilauryl phosphite; dibutyl acid phosphite; dilauryl acid phosphite; trilauryl trithiophosphite; bis(neopentylglycol).1,4-cyclohexanedimethyl diphosphite; bis(2,4-ditertiary-butylphenyl)pentaerythritol diphosphite; bis(2,5-ditertiary-butylphenyl)pentaerythritol diphosphite; bis(2,6-ditertiary-butyl-4-methylphenyl)pentaerythritol diphosphite; bis(2,4-dicumylphenyl)pentaerythritol diphosphite; distearylpentaerythritol diphosphite; tetra ($C_{12}$ to $C_{15}$ mixed alkyl)-4,4'-isopropylidene diphenylphosphite; bis[2,2'-methylenebis(4,6-diamylphenyl)]isopropylidene diphenylphosphite; tetratridecyl-4,4'-butylidenebis(2-tertiary-butyl-5-methylphenol)diphosphite; hexa(tridecyl).1,1,3-tris(2-methyl-5-tertiary-butyl-4-hydroxyphenyl)butane.triphosphite; tetrakis(2,4-ditertiary-butylphenyl)biphenylene diphosphonite; tris(2-[(2,4,7,9-tetrakis-tertiary-butyldibenzo[d,f][1,3,2]dioxaphosphepin-6-yl)oxy]ethyl)amine; 9,10-dihydro-9-oxa-10-phosphaphenanthrene-10-oxide; and 2-butyl-2-ethylpropanediol-2,4,6-tritertiary-butylphenol monophosphite.

Examples of the phenol-based antioxidant include: 2,6-ditertiary-butyl-p-cresol; 2,6-diphenyl-4-octadecyloxyphenol; stearyl(3,5-ditertiary-butyl-4-hydroxyphenyl)propionate; distearyl(3,5-ditertiary-butyl-4-hydroxybenzyl) phosphonate; tridecyl 3,5-ditertiary-butyl-4-hydroxybenzylthioacetate; thiodiethylenebis[(3,5-ditertiary-butyl-4-hydroxyphenyl)propionate]; 4,4'-thiobis(6-tertiary-butyl-m-cresol); 2-octylthio-4,6-di(3,5-ditertiary-butyl-4-hydroxyphenoxy)-s-triazine; 2,2'-methylenebis(4-methyl-6-tertiary-butylphenol); bis[3,3-bis(4-hydroxy-3-tertiary-butylphenyl)butylic acid]glycol ester; 4,4'-butylidenebis(2,6-ditertiary-butylphenol); 4,4'-butylidenebis(6-tertiary-butyl-3-methylphenol); 2,2'-ethylidenebis(4,6-ditertiary-butylphenol); 1,1,3-tris(2-methyl-4-hydroxy-5-tertiary-butylphenyl)butane; bis[2-tertiary-butyl-4-methyl-6-(2-hydroxy-3-tertiary-butyl-5-methylbenzyl)phenyl] terephthalate; 1,3,5-tris(2,6-dimetyl-3-hydroxy-4-tertiary-butylbenzyl)isocyanurate; 1,3,5-tris(3,5-ditertiary-butyl-4-hydroxybenzyl)isocyanurate; 1,3,5-tris(3,5-ditertiary-butyl-4-hydroxybenzyl)-2,4,6-trimethylbenzene; 1,3,5-tris[(3,5-ditertiary-butyl-4-hydroxyphenyl)propionyloxyethyl] isocyanurate; tetrakis[methylene-3-(3',5'-ditertiary-butyl-4'-hydroxyphenyl)propionate]methane; 2-tertiary-butyl-4-methyl-6-(2-acryloyloxy-3-tertiary-butyl-5-methylbenzyl) phenol; 3,9-bis[2-(3-tertiary-butyl-4-hydroxy-5-methylhydrocinnamoyloxy)-1,1-dimethylethyl]-2,4,8,10-tetraoxaspiro[5,5]undecane; triethylene glycol bis[β-(3-tertiary-butyl-4-hydroxy-5-methylphenyl)propionate]; and tocopherol and a derivative thereof.

Examples of the sulfur-based antioxidant include: dialkylthio dipropionates such as dilauryl, dimyristyl, myristyl stearyl, and distearyl esters of thiodipropionic acid; and β-alkylmercaptopropionates such as pentaerythritol tetra(β-dodecylmercaptopropionate).

Examples of the amine-based antioxidant include: naphthylamine-based antioxidants such as 1-naphthylamine, phenyl-1-naphthylamine, p-octylphenyl-1-naphthylamine, p-nonylphenyl-1-naphthylamine, p-dodecylphenyl-1-naphthylamine, and phenyl-2-naphthylamine; phenylenediamine-based antioxidants such as N,N'-diisopropyl-p-phenylenediamine, N,N'-diisobutyl-p-phenylenediamine, N,N'-diphenyl-p-phenylenediamine, N,N'-di-β-naphthyl-p-phenylenediamine, N-phenyl-N'-isopropyl-p-phenylenediamine, N-cyclohexyl-N'-phenyl-p-phenylenediamine, N-1,3-dimethylbutyl-N'-phenyl-p-phenylenediamine, dioctyl-p-phenylenediamine, phenylhexyl-p-phenylenediamine, and phenyloctyl-p-phenylenediamine; diphenylamine-based antioxidants such as dipyridylamine, diphenylamine, p,p'-di-n-butyldiphenylamine, p,p'-di-t-butyldiphenylamine, p,p'-di-t-pentyldiphenylamine, p,p'-dioctyldiphenylamine, p,p'-dinonyldiphenylamine, p,p'-didecyldiphenylamine, p,p'-didodecyldiphenylamine, p,p'-distyryldiphenylamine, p,p'-dimethoxydiphenylamine, 4,4'-bis(4-α,α-dimethylbenzyl) diphenylamine, p-isopropoxydiphenylamine, and dipyridylamine; and phenothiazine-based antioxidants such as phenothiazine, N-methylphenothiazine, N-ethylphenothiazine, 3,7-dioctylphenothiazine, phenothiazine carboxylate, and phenoselenazine.

Examples of the solvent include water-soluble alcohols such as methanol, ethanol, propanol, isopropanol, butanol, isobutanol, tertial butanol, methyl cellosolve, ethyl cellosolve, butyl cellosolve, ethylene glycol, propylene glycol, glycerin, and diglycerin.

Examples of the antiseptic include: silver-based antiseptics; tin-based antiseptics; parabens; quaternary ammonium salts; pyridinium salts; glycols typified by glycerin aliphatic acid esters, glycerin alkyl ethers, and octanediol; sodium alginates; and catechins.

The aqueous coating agent composition of the present invention can be obtained by adding the light stabilizer emulsion composition of the present invention to an aqueous coating agent composition such as: an aqueous emulsion composition such as aqueous paint; an aqueous ink composition using a coloring agent such as a dye or a pigment; an aqueous coating agent composition for paper such as ink-jet paper, heat sensitive paper, or wall paper; a coating agent composition for floors such as wood, tile, or cushion floors; an aqueous coating agent composition for a fiber; an aqueous coating agent composition for optics such as a protective layer of an optical recording carrier; and an aqueous coating agent composition intended for protecting and decorating metal, glass, or the like. The light stabilizer emulsion composition of the present invention is preferably added in such a manner that the amount of a light stabilizer or the like is 0.001 to 5 parts by mass (weight) with respect to 100 parts by mass (weight) of the aqueous coating agent composition.

The aqueous coating agent composition of the present invention may be added with the above-described surfactant, antioxidant, solvent, or antiseptic, or a film-forming auxiliary, a pigment, a dye, an inorganic filler, an organic filler, a dispersant, a viscosity modifier, a defoaming agent, a plasticizer, a curing agent, a curing accelerator, a polymerization inhibitor, a pH adjustor, an oxygen absorbent, or the like as required.

The aqueous coating agent composition of the present invention can be applied to the surface of each of various substrates such as wood, paper, a fiber, concrete, mortar, stone, ceramic, glass, plastics, and metal directly or via base coating. The composition can be applied or printed by means of a known method such as spray coating, brush coating, roll coating, shower coating, immersion coating, electrodeposition coating, printing by means of a printer or the like, or printing by means of a writing utensil such as a pen.

A coated product of the present invention has a coating film formed of the aqueous coating agent composition of the present invention, and examples thereof include: the outer walls, interior, roof, and floors of structures; the exterior and interior of automobiles; clothing products; leather products; artificial leather products; paper such as ink-jet paper and heat sensitive paper; printed articles; instruments for home and offices; and optical materials such as lenses, plastic films, substrates, and optical disks.

An effect of the present invention is to provide a light stabilizer emulsion composition which has good long-term storage stability, does not deteriorate various physical properties of a coating film to be formed even when the composition is added to an aqueous coating agent composition, and is constituted by components having a small average particle size.

Hereinafter, the present invention will be specifically described by way of examples. Unless otherwise stated, "%" and "ppm" in the following examples and the like are on a mass (weight) basis.

Methods of producing and testing a light stabilizer emulsion composition are shown below.

<Method of Producing Light Stabilizer Emulsion Composition>

A light stabilizer or the like and an emulsifier were loaded into a 1,000-ml vessel equipped with a homomixer and a heat-increasing device, and the temperature of the mixture was heated to 60 to 70° C. while the mixture was mixed by means of the homomixer. A predetermined amount of water was gradually charged into the vessel while the situation in the vessel was observed. After a certain amount of water had been charged, a phase inversion from a W/O emulsion to an O/W emulsion occurred. After the phase inversion had been confirmed, the temperature was cooled to 30 to 40° C., and all the remaining water was added. After that, the resultant was continuously stirred for 2 hours to yield a pre-emulsion composition. The resultant pre-emulsion composition was treated by means of a high-pressure homogenizer (HJP-25005 manufactured by SUGINO MACHINE LIMITED) at 20 to 40° C. to yield a light stabilizer emulsion composition. Table 1 shows the kinds and amounts of the light stabilizer or the like and the emulsion, the amount of water, average particle size, and time for treatment by means of the high-pressure homogenizer. The average particle size of components constituting the light stabilizer emulsion composition was measured by means of a particle size distribution meter (ELS-8000 manufactured by Otsuka Electronics Co., Ltd.) after the resultant emulsion composition had been diluted with water 1,000-fold.

Furthermore, the pre-emulsion composition was treated by means of a bead mill (Ultraspec Mill UAM-015 manufactured by KOTOBUKI INDUSTRIES CO., LTD.) using zirconia beads each having a diameter of 0.1 mm at 20 to 40° C., and then an average particle size was measured. Table 1 shows results provided by the beads mill, a compounding ratio, and a treatment time. It should be noted that those treated by means of the high-pressure homogenizer correspond to Examples 1 to 12 and Comparative Examples 1 to 6, while those treated by means of the beads mill correspond to Examples 13 to 17 and Comparative Example 7.

<Storage Stability Test>

80 ml of the resultant light stabilizer emulsion composition as placed in a 100-ml closed vessel made of glass and stored for 50 days in a thermostat at 50° C., and the external appearance of the emulsion composition 10 days, 20 days, 30 days, 40 days, and 50 days after the beginning of the storage were observed. Table 2 shows the results. In Table 2, ⊚: uniform, ○: a surface is slightly separated, Δ: the separation of a surface is clear, ×: entire nonuniformity or large separation is observed, and ××: complete separation occurs.

<Coating Film Test 1>

A light stabilizer emulsion composition was added to a commercially available gloss paint (AQUAGLOSS manufactured by Kansai Paint Co., Ltd.) in such a manner that the concentration of a light stabilizer or the like would be 1 mass (weight) %, and the resultant was stirred until it became uniform. After that, a coating film was formed on a glass plate by means of a 10-mil applicator. After the coating film was dried, the gloss value of the coating film was measured by means of a gloss meter (VG2000 manufactured by NIPPON DENSHOKU). Ggloss value after the addition of the light stabilizer or the like was subtracted from a gloss value before the addition, and the obtained value was defined as a dropped gloss value. The lower the dropped gloss value the less the gloss of the original paint is lost and the better the performance is.

<Coating Film Test 2>

A coating liquid having the following formulation was diluted to prepare a 15-mass % aqueous solution. Woodfree paper was coated with the solution by means of a bar coater in such a manner that the amount of the solution per unit area of the paper would be 10 g/m². The coated paper was dried in such a manner that no wrinkles would occur on the paper. After that, letters and figures each using three colors (that is, cyan, yellow, and magenta) were printed on the coated paper by means of an ink-jet printer (BJC-600J manufactured by Canon Inc.). The paper on which the letters and figures had been printed were sandwiched between two glass plates each having a thickness of 1 mm so that the paper would be out of contact with the air. After that, the resultant was left in a place receiving sunlight, and the color of each of the printed letters and figures was visually observed. In Table 3, ○: no change, Δ: color fading is slightly observed, and ×: color fading is clear.

(Coating Liquid)

| | |
|---|---|
| White carbon (powdered silica/cationic colloidal silica = 9/1): | 75 parts by mass |
| Polyvinyl alcohol (degree of polymerization n = 1,000, 99.9% saponified): | 15 parts by mass |
| Cation polymer (dimethyldiallylammonium chloride polymer): | 10 parts by mass |
| Light stabilizer emulsion composition: | 2 parts by mass |

The light stabilizer emulsion composition was blended in such a manner that the amount of a pure light stabilizer or the like would be 2 parts by mass.

The emulsifier and the light stabilizer or the like used for the test are shown below. In the following description, EO represents ethylene oxide, PO represents propylene oxide, and BO represents butylene oxide.

<Emulsifier>

A1: Tridecanol 11EO/3PO random copolymer

A2: Tridecanol 25EO/5BO random copolymer

A3: Tridecanol 50EO/8PO random copolymer

A4: Tridecanol 11EO/3PO block copolymer

A5: Oleyl alcohol 25EO/4PO random copolymer

A6: Butanol 8EO/2PO block copolymer

A7: 10EO/3PO random copolymer of 2-ethylhexyl acid

B1: Sorbitan oleate

B2: 6EO adduct of sorbitan laurate

B3: H-(EO)$_5$—(PO)$_{60}$-(EO)$_5$—H

B4: H-(EO)$_6$—(PO)$_{30}$-(EO)$_6$—H

C1: Tridecanol 12EO

C2: Oleyl alcohol 25EO

Emulsifiers A1 to A7 are compounds included in the nonionic surfactant (A), while emulsifiers B1 to B4 are compounds included in the nonionic surfactant (B).

<Light Stabilizer or the Like>

D1:

CH$_2$—COO—R
|
CH—COO—R
|
CH—COO—R
|
CH$_2$—COO—R

[In the formula, R's each represent (X) the following group or (Y) —C$_{13}$H$_{27}$, and (X)/(Y)=1/1 (molar ratio).]

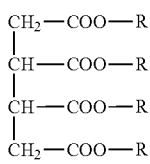
(X)

D2:

CH$_2$—COO—R'
|
CH—COO—R'
|
CH—COO—R'
|
CH$_2$—COO—R'

[In the formula, R's each represent (X') the following group or (Y) —C$_{13}$H$_{27}$, and (X')/(Y)=1/3 (molar ratio).]

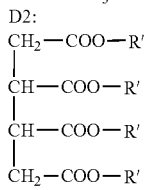
(X')

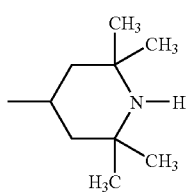

D3:

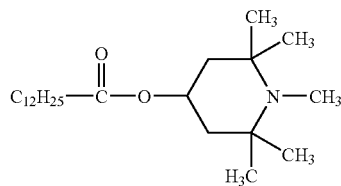

D4:

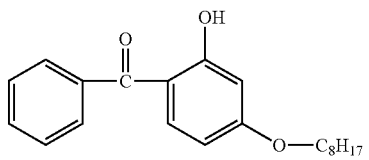

-continued

D5:

A pentaerythritol-based compound with four arms, each being —CH₂—O—C(=O)—C₂H₄—(3,5-di-tert-butyl-4-hydroxyphenyl), i.e., tetrakis[methylene-3-(3,5-di-tert-butyl-4-hydroxyphenyl)propionate]methane:

$$C(CH_2-O-CO-C_2H_4-C_6H_2(C_4H_9)_2(OH))_4$$

TABLE 1

| | Example 1 | 2 | 3 | 4 | 5 | 6 | 7 | 8 | 9 | 10 | 11 | 12 |
|---|---|---|---|---|---|---|---|---|---|---|---|---|
| A1 | 15 | | | | | | | 10 | 10 | 10 | 7 | 7 |
| A2 | | 15 | | | | | | | | | 7 | 7 |
| A3 | | | 15 | | | | | | | | | |
| A4 | | | | 15 | | | | | | | | |
| A5 | | | | | 15 | | | | | | | |
| A6 | | | | | | 20 | | | | | | |
| A7 | | | | | | | 20 | | | | | |
| B1 | | | | | | | | 3 | | | | |
| B2 | | | | | | | | | 3 | | 2 | 2 |
| B3 | | | | | | | | | | 5 | | |
| B4 | | | | | | | | | | | 7 | 7 |
| C1 | | | | | | | | | | | | |
| C2 | | | | | | | | | | | | |
| D1 | 30 | | | 30 | | 30 | 30 | 30 | 30 | 30 | 40 | 40 |
| D2 | | 30 | | | | | | | | | | |
| D3 | | | 30 | | | | | | | | | |
| D4 | | | | | 30 | | | | | | | |
| D5 | | | | | | | | | | | | |
| Water | Balance | Balance | Balance | Balance | Balance | Balance | Balance | Balance | Balance | Balance | Balance | Balance |
| Average particle size (nm) | 131 | 135 | 133 | 146 | 134 | 145 | 142 | 128 | 122 | 113 | 112 | 121 |
| C/D (hours) | 2.5 | 2.5 | 2.5 | 2.5 | 2.5 | 2.5 | 2.5 | 2.5 | 2.5 | 2.5 | 2.5 | 1.5 |

| | Example 13 | 14 | 15 | 16 | 17 | Comparative example 1 | 2 | 3 | 4 | 5 | 6 | 7 |
|---|---|---|---|---|---|---|---|---|---|---|---|---|
| A1 | 15 | | | 10 | 10 | | | | | | 2 | 8 |
| A2 | | 15 | | | | | | | | | | |
| A3 | | | 15 | | | | | | | | | |
| A4 | | | | | | | | | | | | |
| A5 | | | | | | | | | | | | |
| A6 | | | | | | | | | | | | |
| A7 | | | | | | | | | | | | |
| B1 | | | | 3 | | | | | | | | |
| B2 | | | | | 3 | | | 5 | 2 | 5 | | 5 |
| B3 | | | | | 7 | | | 10 | 5 | 10 | | 10 |
| B4 | | | | | | | | | | | | |
| C1 | | | | | | 15 | | | 8 | | | |
| C2 | | | | | | | 15 | | | | | |
| D1 | 30 | | | | 30 | 30 | 30 | 30 | 30 | 30 | 50 | 30 |
| D2 | | 30 | | | | | | | | | | |
| D3 | | | 30 | | | | | | | | | |
| D4 | | | | | | | | | | | | |
| D5 | | | | 30 | | | | | | | | |

TABLE 1-continued

| Water Average particle size (nm) | Balance 135 | Balance 140 | Balance 127 | Balance 85 | Balance 117 | Balance 280 | Balance 304 | Balance 420 | Balance 315 | Balance 253 | Balance 285 | Balance 477 |
|---|---|---|---|---|---|---|---|---|---|---|---|---|
| C/D (hours) | 2.5 | 2.5 | 2.5 | 2.5 | 2.5 | 2.5 | 2.5 | 2.5 | 2.5 | 2.5 | 2.5 | 2.5 |

TABLE 2

| | Results of storage stability test | | | | | Dropped gloss value |
|---|---|---|---|---|---|---|
| | After 10 days | After 20 days | After 30 days | After 40 days | After 50 days | |
| Example 1 | ◎ | ◎ | ◎ | ◎ | ◎ | 0.3 |
| Example 2 | ◎ | ◎ | ◎ | ◎ | ◎ | 0.3 |
| Example 3 | ◎ | ◎ | ◎ | ◎ | ○ | 0.4 |
| Example 4 | ◎ | ◎ | ◎ | ◎ | ◎ | 0.3 |
| Example 5 | ◎ | ◎ | ◎ | ◎ | ◎ | 0.3 |
| Example 6 | ◎ | ◎ | ◎ | ○ | ○ | 0.4 |
| Example 7 | ◎ | ◎ | ◎ | ◎ | ○ | 0.3 |
| Example 8 | ◎ | ◎ | ◎ | ◎ | ◎ | 0.3 |
| Example 9 | ◎ | ◎ | ◎ | ◎ | ◎ | 0.2 |
| Example 10 | ◎ | ◎ | ◎ | ◎ | ◎ | 0.1 |
| Example 11 | ◎ | ◎ | ◎ | ◎ | ◎ | 0.1 |
| Example 12 | ◎ | ◎ | ◎ | ◎ | ◎ | 0.2 |
| Example 13 | ◎ | ◎ | ◎ | ◎ | ◎ | 0.2 |
| Example 14 | ◎ | ◎ | ◎ | ◎ | ◎ | 0.1 |
| Example 15 | ◎ | ◎ | ◎ | ○ | ○ | 0.4 |
| Example 16 | ◎ | ◎ | ◎ | ◎ | ◎ | 0 |
| Example 17 | ◎ | ◎ | ◎ | ○ | ○ | 0.4 |
| Comparative Example 1 | ○ | △ | X | XX | XX | 1.8 |
| Comparative Example 2 | ○ | △ | X | XX | XX | 3.2 |
| Comparative Example 3 | ◎ | ○ | △ | △ | X | 7.2 |
| Comparative Example 4 | ◎ | ◎ | ◎ | ○ | △ | 2.8 |
| Comparative Example 5 | ◎ | ◎ | ○ | △ | △ | 1.5 |
| Comparative Example 6 | ◎ | ◎ | ◎ | ○ | △ | 1.8 |
| Comparative Example 7 | ◎ | ○ | △ | X | XX | 6.9 |

TABLE 3

| | Results of color fading test | | | | |
|---|---|---|---|---|---|
| | After 1 day | After 3 days | After 5 days | After 10 days | After 20 days |
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | △ |
| Example 5 | ○ | ○ | ○ | ○ | ○ |
| Example 6 | ○ | ○ | ○ | ○ | △ |
| Example 7 | ○ | ○ | ○ | ○ | △ |
| Example 8 | ○ | ○ | ○ | ○ | ○ |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○ |
| Example 13 | ○ | ○ | ○ | ○ | ○ |
| Example 14 | ○ | ○ | ○ | ○ | ○ |
| Example 15 | ○ | ○ | ○ | ○ | ○ |
| Example 16 | ○ | ○ | ○ | ○ | ○ |
| Example 17 | ○ | ○ | ○ | ○ | ○ |
| Comparative Example 1 | ○ | △ | X | X | X |
| Comparative Example 2 | ○ | △ | X | X | X |
| Comparative Example 3 | ○ | △ | X | X | X |
| Comparative Example 4 | ○ | △ | △ | X | X |
| Comparative Example 5 | ○ | ○ | △ | △ | X |
| Comparative Example 6 | ○ | △ | △ | X | X |
| Comparative Example 7 | ○ | X | X | X | X |
| Comparative Example 8 | X | X | X | X | X |

In Comparative Example 8, no light stabilizer or the like is blended.

What is claimed is:

1. A light stabilizer emulsion composition comprising:
   water;
   at least one of a light stabilizer and a UV absorber; and
   an emulsifier comprising a nonionic surfactant (A) and a nonionic surfactant (B), wherein the nonionic surfactant (B) comprises a sorbitan ester-based compound, wherein the content of the emulsifier is within a range of 40 parts by mass (weight) (exclusive) to 100 parts by mass (weight) (inclusive) with respect to 100 parts by mass (weight) of the light stabilizer and/or UV absorber, and wherein the amount of the nonionic surfactant (A) accounts for 50 to 100 weight % of the total amount of the emulsifier;
   wherein components constituting the light stabilizer emulsion composition have an average particle size of 150 nm or less.

2. The light stabilizer emulsion composition according to claim 1, wherein the nonionic surfactant (A) has a polyether chain containing an oxyethylene group and an oxyalkylene group having 3 or more carbon atoms and has a hydrocarbon group.

3. The light stabilizer emulsion composition according to claim 1, wherein the nonionic surfactant (A) comprises a compound represented by the following formula (1):

$$R\text{—}O\text{-}(AO)_n\text{—}H \qquad (1),$$

wherein R represents a hydrocarbon group having 8 to 30 carbon atoms, A represents two or more alkylene groups each having 2 to 4 carbon atoms, ethylene groups account for 50 mol % or more of A, and n represents a number of from 8 to 80.

4. The light stabilizer emulsion composition according to claim 3, wherein R represents an aliphatic hydrocarbon group having 8 to 16 carbon atoms and n represents 8 to 30 in the formula (1).

5. The light stabilizer emulsion composition according to claim 1, wherein the nonionic surfactant (B) further comprises a compound represented by the following formula (2):

$$\text{H-(EO)}_p\text{—(PO)}_q\text{-(EO)}_r\text{—OH} \quad (2),$$

wherein EO represents an oxyethylene group, PO represents an oxypropylene group, q represents a number of 20 to 80, p and r each independently represent a number of 2 to 32, and oxyethylene groups account for 30 wt % or less of the total compound.

6. The light stabilizer emulsion composition according to claim 1, wherein the at least one light stabilizer comprises a hindered amine compound.

7. The light stabilizer emulsion composition according to claim 1, wherein the content of the at least one light stabilizer and the UV absorber is within a range of 1 to 50 weight %.

8. An aqueous coating agent composition comprising the light stabilizer emulsion composition according to claim 1.

9. A coated product comprising a coating film formed of the aqueous coating agent composition according to claim 8.

10. The light stabilizer emulsion composition according to claim 2, wherein the nonionic surfactant (A) comprises a compound represented by the following formula (1):

$$\text{R—O-(AO)}_n\text{—H} \quad (1),$$

wherein R represents a hydrocarbon group having 8 to 30 carbon atoms, A represents two or more alkylene groups each having 2 to 4 carbon atoms, ethylene groups account for 50 mol % or more of A, and n represents a number of from 8 to 80.

11. A light stabilizer emulsion composition comprising:
water;
at least one of a light stabilizer and a UV absorber;
an antioxidant;
a solvent other than water;
an antiseptic; and
an emulsifier comprising a nonionic surfactant (A) and a nonionic surfactant (B), wherein the nonionic surfactant (B) comprises a sorbitan ester-based compound, wherein the content of the emulsifier is within a range of 40 parts by mass (weight) (exclusive) to 100 parts by mass (weight) (inclusive) with respect to 100 parts by mass (weight) of the light stabilizer and/or UV absorber, and wherein the amount of the nonionic surfactant (A) accounts for 50 to 100 weight % of the total amount of the emulsifier;
wherein components constituting the light stabilizer emulsion composition have an average particle size of 150 nm or less.

* * * * *